United States Patent [19]
Huang

[11] Patent Number: 5,894,638
[45] Date of Patent: Apr. 20, 1999

[54] STRAPPING DEVICE

[76] Inventor: Han-Ching Huang, No. 12, Alley 111, Lane 437, Chen Hsing Road, Taichung, Taiwan

[21] Appl. No.: 09/134,944

[22] Filed: Aug. 17, 1998

[51] Int. Cl.$^6$ ..................... B25B 25/00
[52] U.S. Cl. ..................... 24/68 CD; 24/68 R
[58] Field of Search ............. 24/68 CD, 68 R, 24/68 B, 19; 410/103

[56] References Cited

U.S. PATENT DOCUMENTS

| | | | |
|---|---|---|---|
| 4,199,182 | 4/1980 | Sunesson | 24/68 CD |
| 4,570,305 | 2/1986 | Smetz et al. | 24/68 CD |
| 5,369,848 | 12/1994 | Huang | 24/68 CD |
| 5,560,086 | 10/1996 | Huang | 24/68 CD |
| 5,778,496 | 7/1998 | Huang | 24/68 CD |

*Primary Examiner*—Victor N. Sakran
*Attorney, Agent, or Firm*—Charles E. Baxley, Esq.

[57] ABSTRACT

A strapping device includes two side plates with a connecting plate connected therebetween, an inverted U-shaped handle mounted to the side plates with a shaft extending through the handle and the side plates, two ratchets fixedly mounted to the shaft and co-rotatably mounted to the shaft. Each of the two side plates each have two slots and an elongated slot, two members slidably connected between the side plates and received in the two slots so that one of the members is engaged with the ratchets. Two slidable plates are connected to the two side plates with a rod extending through the elongated slots and the slidable plates, each of the peripheries defining the two elongated slots having a recess defined therein so as to receive the rod therein which is lifted by the other member received in the slots. The member to lift the rod is pushed by a cam device defined in each of the distal ends of the handle.

8 Claims, 7 Drawing Sheets

5,894,638

STRAPPING DEVICE

FIELD OF THE INVENTION

The present invention relates to a strapping device, and more particularly, to an improved strapping device having a simple structure with two pawl members slidably connected between two side plates of the body and one of the pawl members can be pushed to disengage the function rod from the recess wherein the function rod is received to let the strap run a short of distance.

BACKGROUND OF THE INVENTION

Strapping devices are used to wrap piles of boxes for example tightly so that the piles of boxes are maintained in a stable status which is benefit when transportation. In order to ensure the piles of boxes will not fall downwardly, the operators have to check the piles of boxes to prevent the higher portion of the piles of boxes from suddenly falling to injure the operators so that the conventional strapping devices are developed to have the function of loosening the strap slightly and still holding the boxes if the strapping devices are not operated to loosen the straps completely. Two known strapping device having such function are disclosed applicant's U.S. Pat. No. 5,778,496 issued on Jul. 14, 1998 and U.S. patent application Ser. No. 08/901,758, filed on Jul. 28, 1997 which is under the procedure of issuance. Both the two strapping devices resolve the problems described above, However, they include so many parts which increase weight of the strapping device so that are inconvenient for the operators to handle. Furthermore, the more the parts are included, the higher maintenance expense is needed.

The present invention provides a strapping device including fewer parts and easily to be operated so that the shortcomings mentioned above are properly mitigated.

SUMMARY OF THE INVENTION

In accordance with one aspect of the present invention, there is provided an strapping device comprising two side plates each having a first end and a second end in which a first notch and a second notch are defined, a connecting plate connected between the two side plates with a stop extending therefrom. Each of the two side plates has a first slot and a second slot defined therethrough and located near the second end of the side plate corresponding thereto. Each of the two side plates has a first elongated slot defined therethrough and located between the first end thereof and the first slot and the second slot corresponding thereto. Each of the first elongated slots has a recess defined in an inner periphery thereof.

An inverted U-shaped handle is mounted to the two respective second ends of the two side plates, a shaft rotatably extending through the two respective second ends of the two side plates and fixedly connected between two distal ends of the handle. Two ratchets are fixedly mounted to the shaft and respectively located between each pair of side plate and the distal end of the handle. An actuating member is movably and biasedly connected to the handle and engaged with the two ratchets.

A first member is movably received in the two first slots and has two first pawls engaged with the two ratchets, a second member movably received in the two second slots and having two second pawls. The first member and the second member are respectively and biasedly connected to the stop of the connecting member.

Two slidable plates each have a second elongated slot and a first hole defined therethrough. The two slidable plates are respectively and movably connected to the two side plates. A first rod extends through the second slots and the two recesses, and a second rod extends through the first holes of the two slidable plates. The two second pawls of the second member are pushed by the two distal ends of the handle by rotating the handle to lift the first rod from the recesses.

It is an object of the present invention to provide a strapping device having a simple structure.

Further objects, advantages, and features of the present invention will become apparent from the following detailed description with appropriate reference to the accompanying drawings.

DETAILED DESCRIPTION OF THE PREFERRED EMBODIMENT

Figure 1:
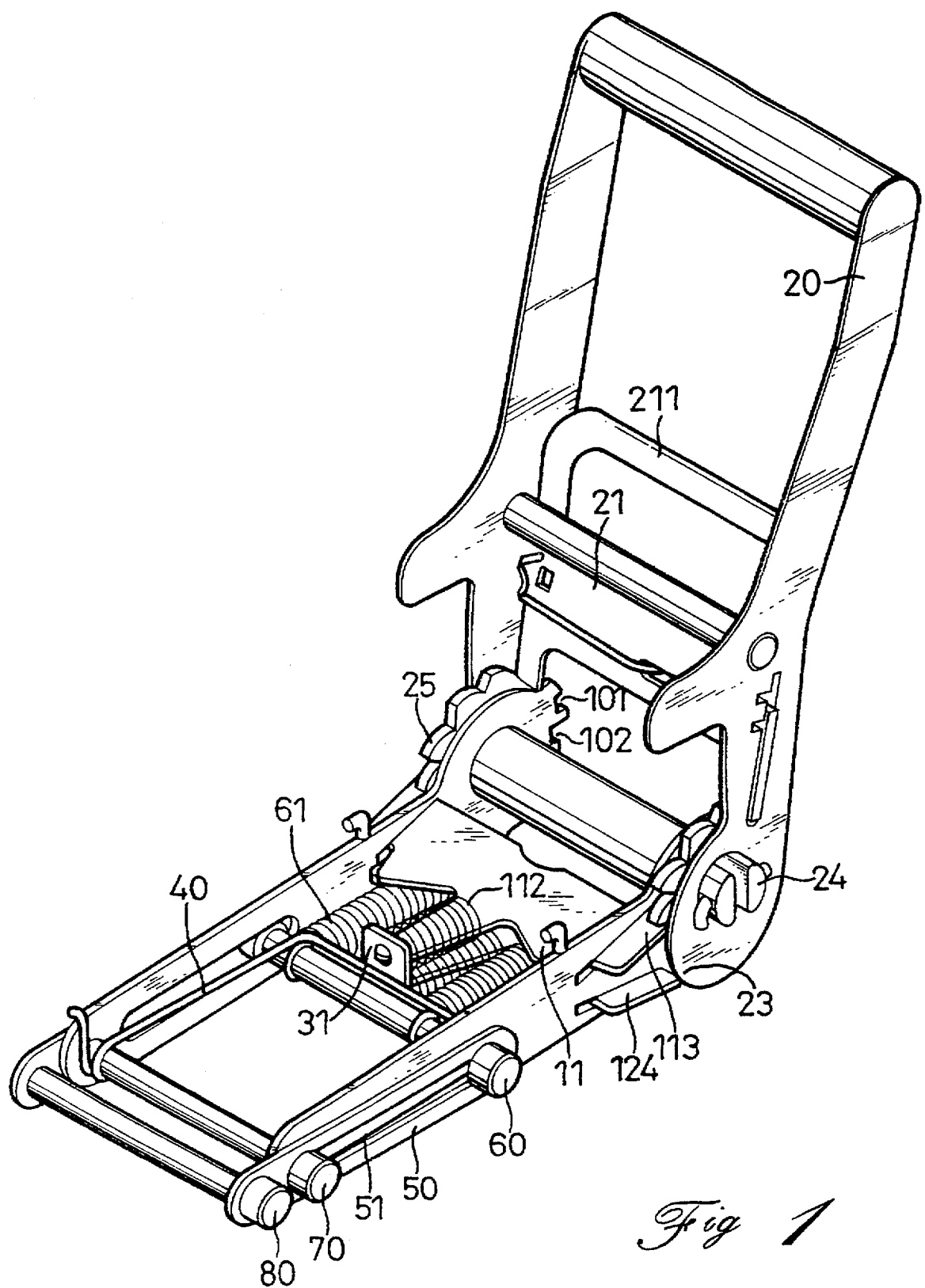
FIG. 1 is a perspective view of the strapping device in accordance with the present invention.
Figure 2:
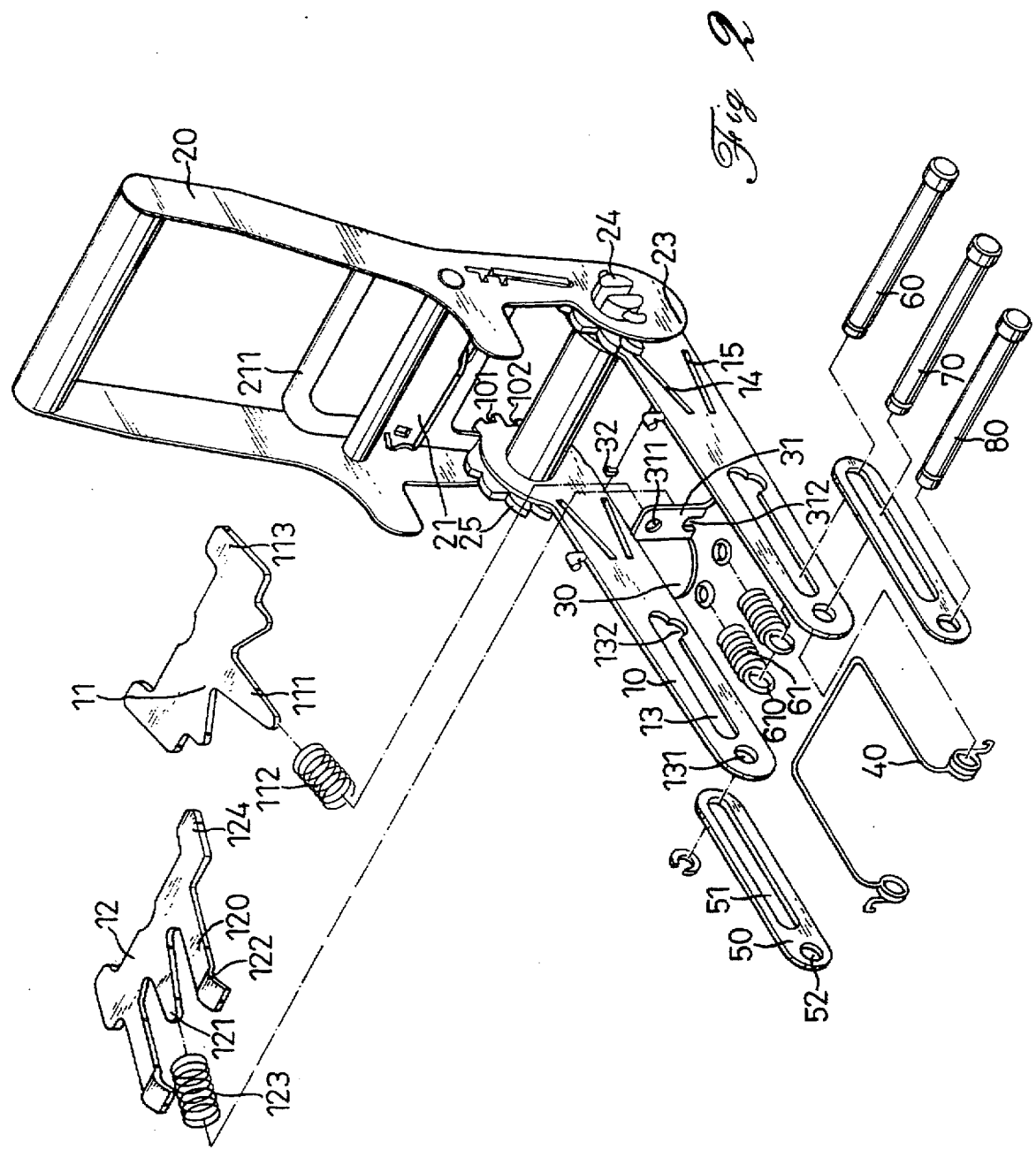
FIG. 2 is an exploded view of the strapping device in accordance with the present invention.
Figure 3:
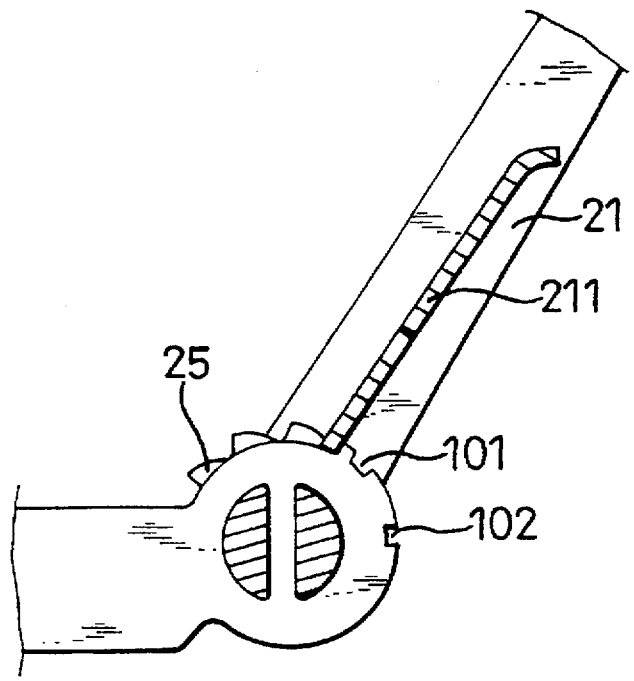
FIG. 3 is a side elevational view, partly in section, of the strapping device in accordance with the present invention, wherein the actuating member is engaged with the ratchets (only one is shown)

Referring to FIGS. 1 to 3, the strapping device in accordance with the present invention comprises two side plates 10 each having a first end and a second end in which a first notch 101 and a second notch 102 are respectively defined in the periphery thereof. A connecting plate 30 is connected between the two side plates 10 with a stop 31 extending therefrom which has a hole 311 and a cutout 312 defined therethrough. Each of the two side plates 10 has a first slot 14 and a second slot 15 defined therethrough and located near the second end of the side plate 10 corresponding thereto. Each of the first slots 14 is located above the second slot 15 corresponding thereto. Each of the second slots 15 is inclined to the longitudinal axis of the side plates 10 corresponding thereto, wherein the periphery defining each of the second slots 15 has a first end thereof higher than a second end thereof which is located near the handle 20. Each of the two side plates 10 has a first elongated slot 13 defined therethrough and located between the first end of the side plate 10 and the first slot 14 and the second slot 15 corresponding thereto. Each of the first elongated slots 13 has a recess 132 defined in an inner periphery thereof. A first hole 131 is defined in the first end of each of the two side plates 10.

An inverted U-shaped handle 20 is mounted to the two respective second ends of the two side plates 10, and each of the two distal ends of the inverted U-shaped handle 20 has a cam means 23 defined therein. A shaft 24 rotatably extends through the two respective second ends of the two side plates 10 and is fixedly connected between the two distal ends of the handle 20. Two ratchets 25 are fixedly mounted to the shaft 24 and respectively located between each pair of side plate 10 and the distal end of the handle 20. An actuating member 21 is movably and biasedly connected to the handle 20 and engaged with the two ratchets 25.

A first member 11 is movably received in the two first slots 14 and has two first pawls 113 engaged with the two ratchets 25. A second member 12 is movably received in the two second slots 15 and has two second pawls 124 extending from the two second slots 15. The first member 11 has a first neck 111 extending therefrom and a spring 112 is mounted to the first neck 111 and biased between the first neck 111 and the stop 31, the first neck 111 is connected to the stop 31 by extending through the hole 311 in the stop 31. The second member 12 has a second neck 121 extending therefrom and a spring 123 is mounted to the second neck 121 and biased between the second neck 121 and the stop 31, the second neck 121 is connected to the stop 31 by being engaged with the cutout 312. Therefore, the first member 11 is biased to engage with the ratchets 25 and the second member 12 is biased toward the handle 20. The second member 12 has two legs 120 extending therefrom and each of the two legs 120 has an end plate 122 connected thereto.

Figure 6:
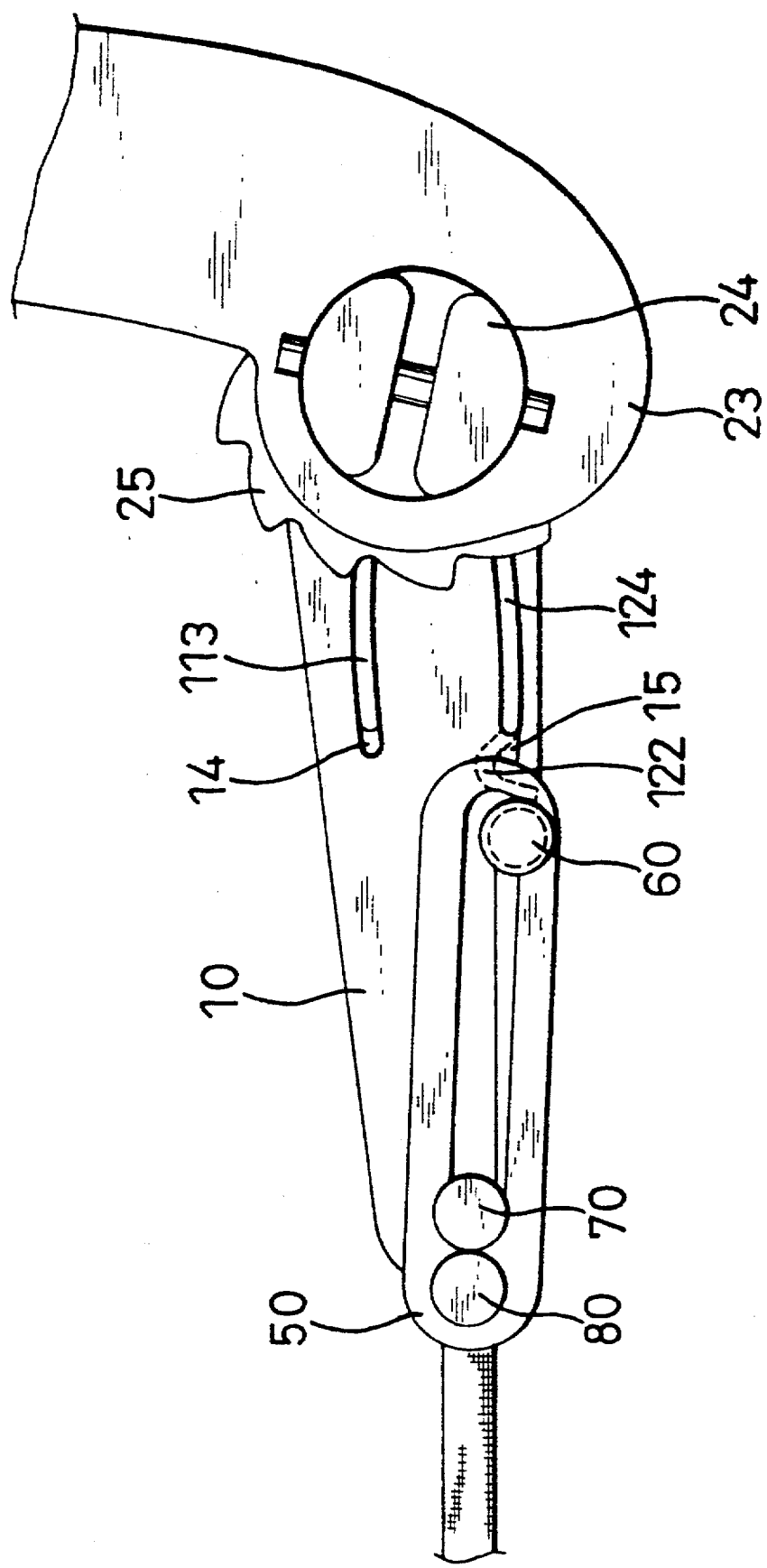
FIG. 6 is a side elevational view, partly in section, of the strapping device in accordance the present invention, wherein the first rod is received in the recesses.

Two slidable plates 50 each have a second elongated slot 51 and a second hole 52 defined therethrough, the two slidable plates 50 respectively and movably connected to the two side plates 10. A first rod 60 extends through the second slots 51 and is received the two recesses 132, wherein the two end plates 122 of the second member 12 contact the first rod 60 as shown in FIG. 6. A second rod 70 extends through the second elongated slots 51 and the two first holes 131, a torsion member 40 mounted to the second rod 70 and compressing the first rod 60. A third rod 80 extends through the second holes 52 of the two slidable plates 50 and is connected to one of two ends of a strap (not shown). Two springs 61 each have a ring 610 on the first end thereof so as to mount to the first rod 60, and the second end thereof fixedly connected to two hooks 32 (only one is shown) of the connecting plate 30.

Figure 4:
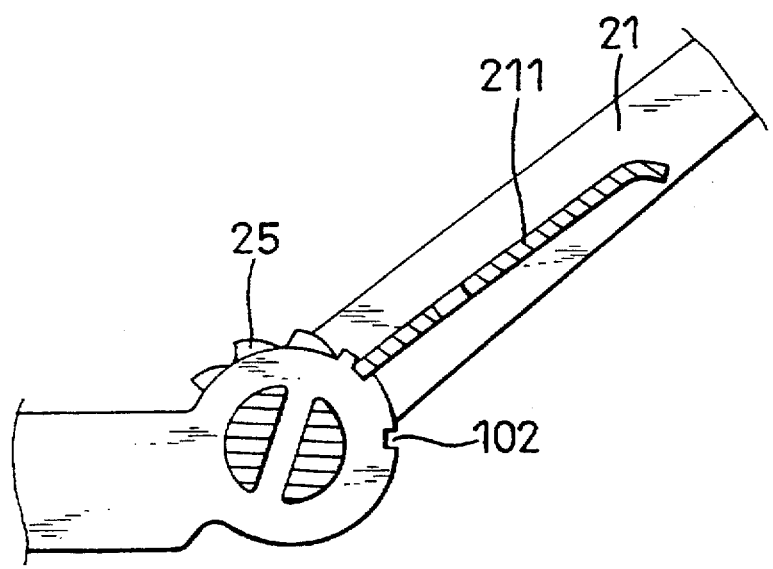
FIG. 4 is a side elevational view, partly in section, of the strapping device in accordance with the present invention, wherein the actuating member is pivoted to engage with the first notches (only one is shown)
Figure 5:
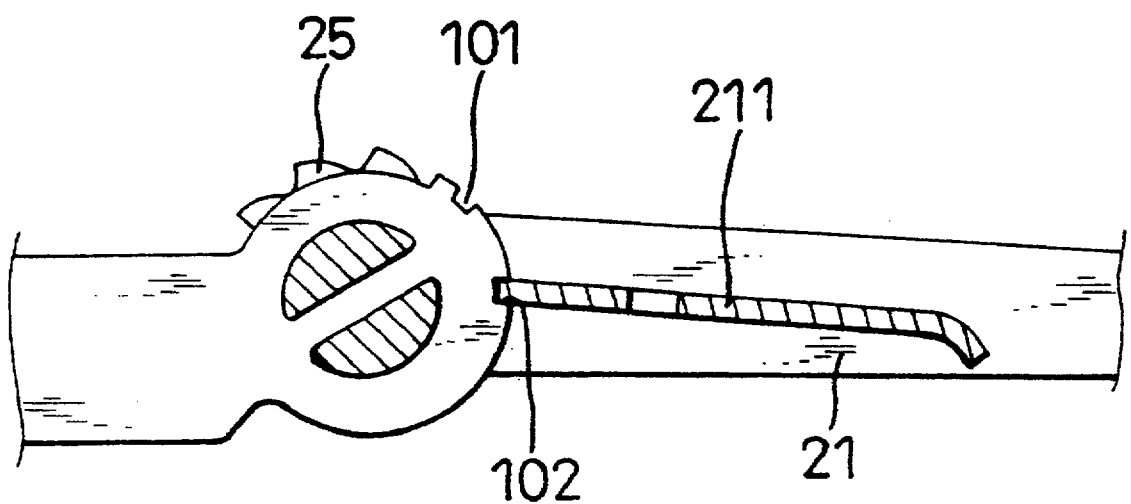
FIG. 5 is a side elevational view, partly in section, of the strapping device in accordance with the present invention, wherein the actuating member is pivoted to engage with the second notches (only one is shown)
Figure 7:
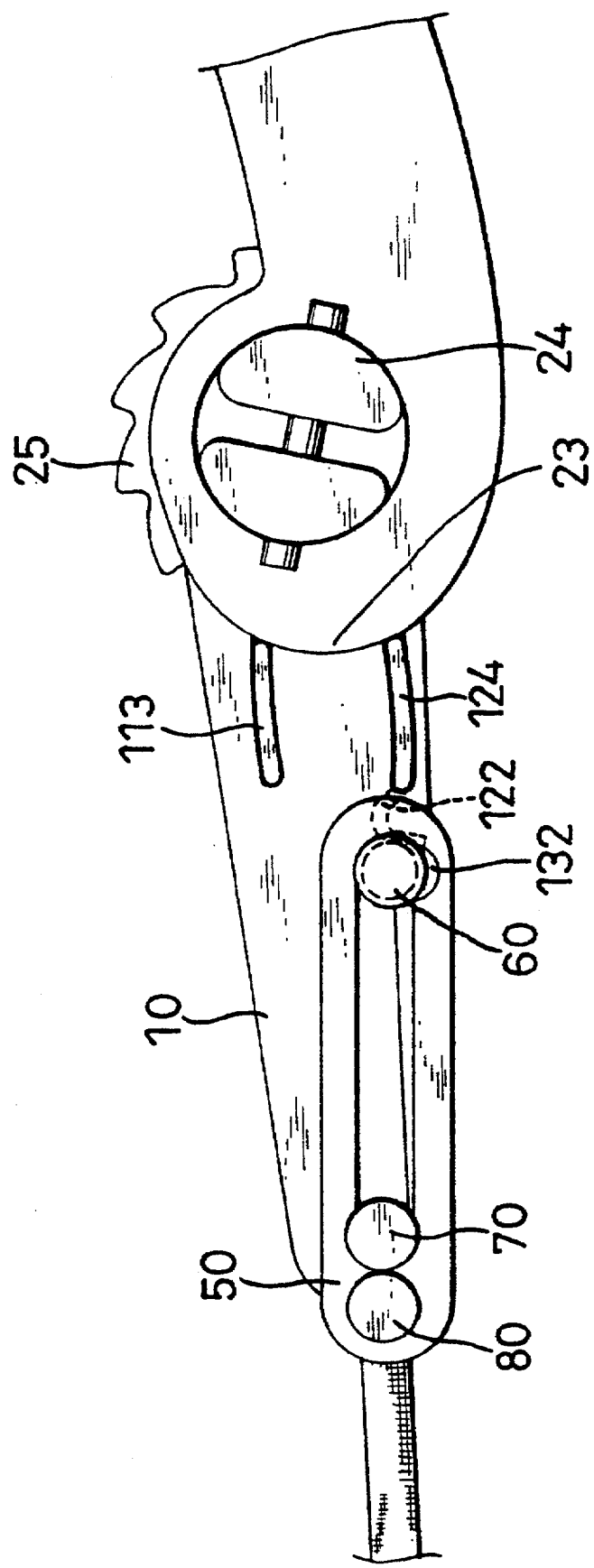
FIG. 7 is a side elevational view, partly in section, of the strapping device in accordance with the present invention, wherein the first rod is lifted from the recesses by the member pushed by the cam means of the handle.
Figure 8:
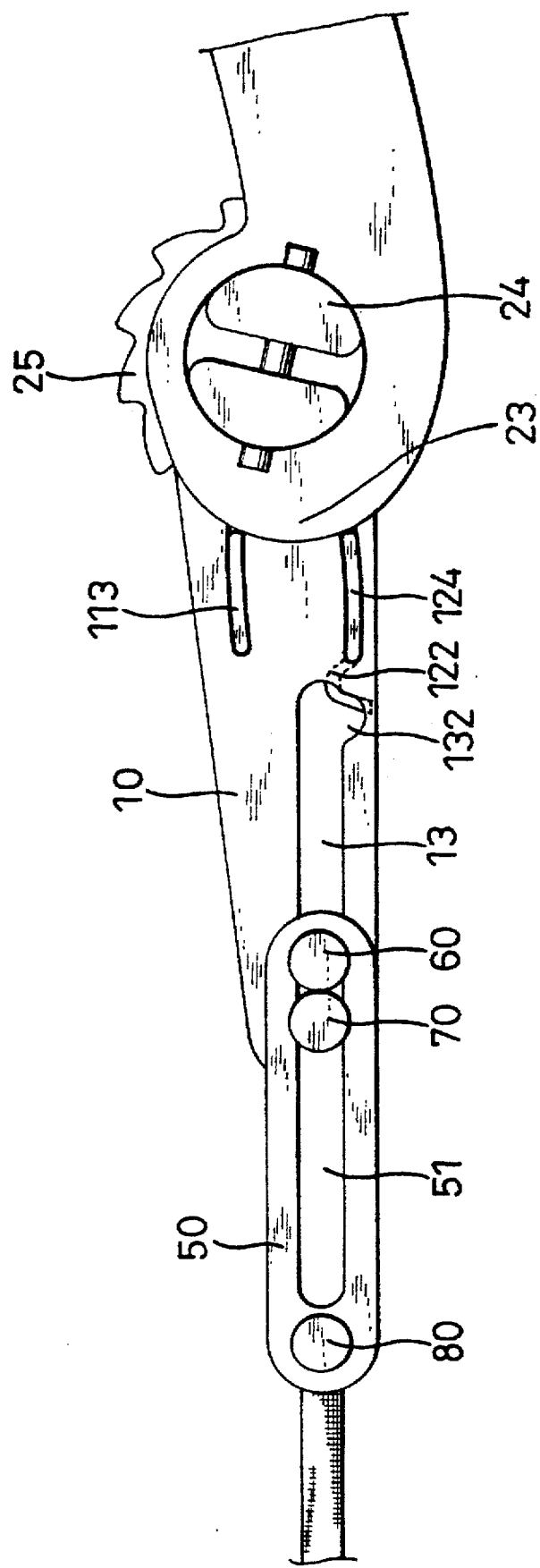
FIG. 8 is a side elevational view, partly in section, of the strapping device in accordance with the present invention, wherein the first rod is lifted from the recesses and the two slidable plates are moved within the two elongated slots in the two side plates.

Referring to FIGS. 4 and 7, when operating the strapping device, the user holds the frame 211 of the actuating member 21 and pulls it upwardly to disengage the actuating member 21 from the ratchets 25, and pivots the handle 20 to let the actuating member 21 be received in the first notches 101, the first rod 60 is then lifted from the recesses 132 by the two end plates 122 of the second member 12 which is pushed by the cam means 23 of the two distal ends of the handle 20. Referring to FIG. 8, once the first rod 60 is lifted from the recesses 132, the two slidable plates 50 are moved by the force applied by the strap to the third rod 80 so that the slidable plates 50 are rapidly pulled till the first rod 60 being stopped by the peripheries of the two first elongated slots 13. Therefore, the strap is loosened slightly to allow the user to check the boxes wrapped by the strap. If the boxes will not fall after checking, the actuating member 21 can be pulled upwardly again to remove the actuating member from the first notches 101 and engaged with the second notches 102 to position the handle 20, the strap is loosened completely and the first rod 60 is pulled to return to the recesses 132 by the two springs 61.

The invention is not limited to the above embodiment but various modification thereof may be made. It will be understood by those skilled in the art that various changes in form and detail may made without departing from the scope and spirit of the present invention.

What is claimed is:

1. A strapping device comprising:

two side plates each having a first end and a second end, a connecting plate connected between said two side plates with a stop extending therefrom, each of said two side plates having a first slot and a second slot defined therethrough and located near said second end of said side plate corresponding thereto, each of said two side plates having a first elongated slot defined therethrough and located between said first end of said side plate and said first slot and said second slot corresponding thereto, each of said first elongated slots having a recess defined in an inner periphery thereof, each of said two second ends of said two side plates having a first notch and a second notch defined in the periphery thereof;

an inverted U-shaped handle mounted to said two respective second ends of said two side plates, a shaft rotatably extending through said two respective second ends of said two side plates and fixedly connected between two distal ends of said handle, two ratchets fixedly mounted to said shaft and respectively located between each pair of side plate and said distal end of said handle, an actuating member movably and biasedly connected to said handle and engaged with said two ratchets;

a first member movably received in said two first slots and having two first pawls engaged with said two ratchets, a second member movably received in said two second slots and having two second pawls, said first member and said second member respectively and biasedly connected to said stop of said connecting member;

two slidable plates each having a second elongated slot and a first hole defined therethrough, said two slidable plates respectively and movably connected to said two side plates and a first rod extending through said second slots and said two recesses, a second rod extending through said first holes of said two slidable plates, said two second pawls of said second member being pushed by said two distal ends of said handle by rotating said handle to lift said first rod from said recesses.

2. The strapping device as claimed in claim 1, wherein each of said first slots is located above said second slot corresponding thereto.

3. The strapping device as claimed in claim 1, wherein each of said first end of said two side plates has a second hole defined therethrough and a third rod extends through said second elongated slots and said two second holes, a torsion member mounted to said third rod and compressing said first rod.

4. The strapping device as claimed in claim 1, wherein each of said two distal ends of said handle has a cam means formed thereto so as to push said first rod.

5. The strapping device as claimed in claim 1, wherein said second member has two legs extending therefrom and each of said two legs has an end plate connected thereto so as to lift said first rod.

6. The strapping device as claimed in claim 1, wherein each of said second slots is inclined to the longitudinal axis of said side plates corresponding thereto, wherein the periphery defining each of said second slots has a first end thereof higher than a second end thereof which is located near said handle.

7. The strapping device as claimed in claim 1 further comprising two springs each having a first end thereof mounted to said first rod and a second end thereof fixedly connected to said connecting plate.

8. The strapping device as claimed in claim 1, wherein said first member has a first neck extending therefrom and a spring is mounted to said first neck and biased between said first neck and said stop, said second member has a second neck extending therefrom and a spring is mounted to said second neck and biased between said second neck and said stop.

\* \* \* \* \*